W. W. NEIGHBOUR.
PAPER FRUIT BOXES.
No. 187,548.            Patented Feb. 20, 1877.
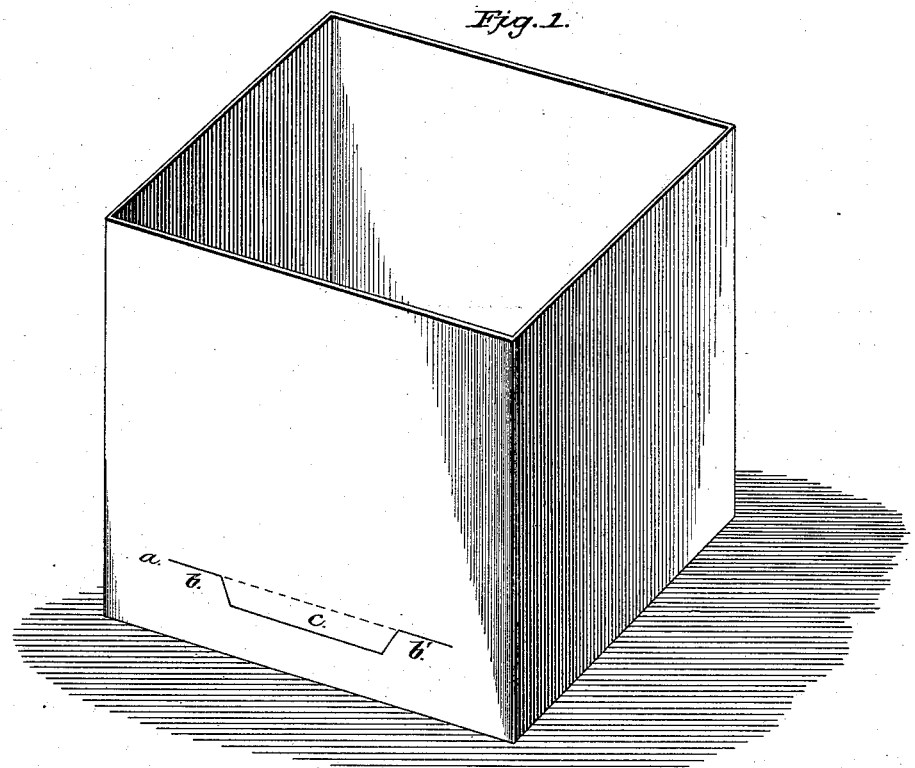
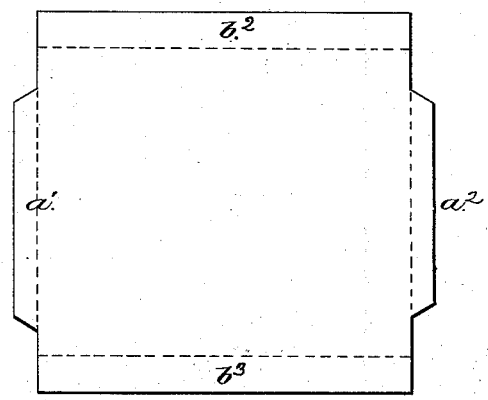

UNITED STATES PATENT OFFICE.

WILLIAM W. NEIGHBOUR, OF CHICAGO, ILLINOIS.

IMPROVEMENT IN PAPER FRUIT-BOXES.

Specification forming part of Letters Patent No. 187,548, dated February 20, 1877; application filed March 27, 1876.

*To all whom it may concern:*

Be it known that I, WM. W. NEIGHBOUR, of the city of Chicago, in the county of Cook and State of Illinois, have invented an Improvement in a Fruit-Box, (for which Letters Patent were granted to me February 8, 1876,) of which the following is a specification:

The nature of my invention consists in making boxes for holding fruit of water-proof pasteboard or paper, in the following manner, viz: The body of the box is to be made of one piece of water-proof pasteboard or paper, bent in the form or shape required, the ends being fastened by lapping and stitching, tacking, or gluing them together. About one-half inch from the bottom of the box a cut or slit, $a$, is to be made in at least two of the opposite sides, so as to form rests $b\ b^1$ for the bottom, and a spring, $c$, as shown in Figure 1 of the accompanying drawing.

The bottom of the box is of a single piece of the same material, with notches cut in the edges, as shown in Fig. 2 of the accompanying drawing. When placed in the box the edges $a^1\ a^2$ are turned down, and slip into the cuts above described, the said spring $c$ holding them in place. The remaining edges $b^2\ b^3$ are turned down, thus giving additional strength to the bottom, and preventing it from being pressed out.

The boxes can be made of any size or shape.

A cover, when required, is made and inserted upon the same principle described for fitting the bottom of the box.

This gives a light, cheap, and easily-constructed box, which can be sent from the factory folded, and is readily adjusted when required for use.

I claim as my invention—

A fruit-box having in at least two of its opposite sides a slit or cut, $a$, forming rests $b\ b^1$, and a spring, $c$, adapted to receive and firmly hold the bottom, which is provided with projections $a\ a^1$ to enter said slits, and projections $b\ b^1$ to turn down, thus giving additional strength, substantially as described.

WILLIAM W. NEIGHBOUR.

Witnesses:
 WILLIAM H. SUMMERS,
 GEORGE W. BELL.